United States Patent [19]
Levin

[11] 3,779,906

[45] Dec. 18, 1973

[54] PLASTIC MOVING-SURFACE TREATMENT OF SEWAGE

[75] Inventor: Gilbert V. Levin, Chevy Chase, Md.

[73] Assignee: Biospherics Incorporated, Rockville, Md.

[22] Filed: Aug. 3, 1972

[21] Appl. No.: 277,504

Related U.S. Application Data

[63] Continuation-in-part of Ser. No. 2,496, Jan. 13, 1970, abandoned.

[52] U.S. Cl. ........................... 210/7, 210/11, 210/17
[51] Int. Cl. ............................................. C02c 1/06
[58] Field of Search ................................... 210/3–9, 210/14, 11, 18, 15, 17, 150, 151, 194–197

[56] References Cited
UNITED STATES PATENTS

| | | | |
|---|---|---|---|
| 3,335,081 | 8/1967 | El-Naggar | 210/15 |
| 3,402,125 | 9/1968 | Tanaka | 210/7 |
| 3,236,766 | 2/1966 | Levin | 210/6 |
| 3,540,589 | 11/1970 | Boris | 210/150 |
| 3,293,174 | 12/1966 | Robjohns | 210/150 X |

*Primary Examiner*—Michael Rogers
*Attorney*—D. C. Roylance et al.

[57] ABSTRACT

A process for the aerobic treatment of sewage. Raw sewage or the liquid portion of primary settled sewage and the sludge portion of secondary settled sewage are simultaneously aerated in the presence of a plurality of bio-surfaces - a bio-surface being a body capable of attracting and offering surface area for the growth of sewage treating microorganisms and also attracting the nutrients necessary for the growth of these microorganisms and the sewage organic materials to be degraded by the treatment process. The bio-surfaces, therefore, form favorable microenvironments where the microorganisms, their life-sustaining nutrients and organic matter in the sewage are brought together in concentrated fashion which promotes the capacity and rate of sewage treatment. The bio-surfaces comprise synthetic plastic surfaces preferably having a surface charge thereon.

11 Claims, 1 Drawing Figure

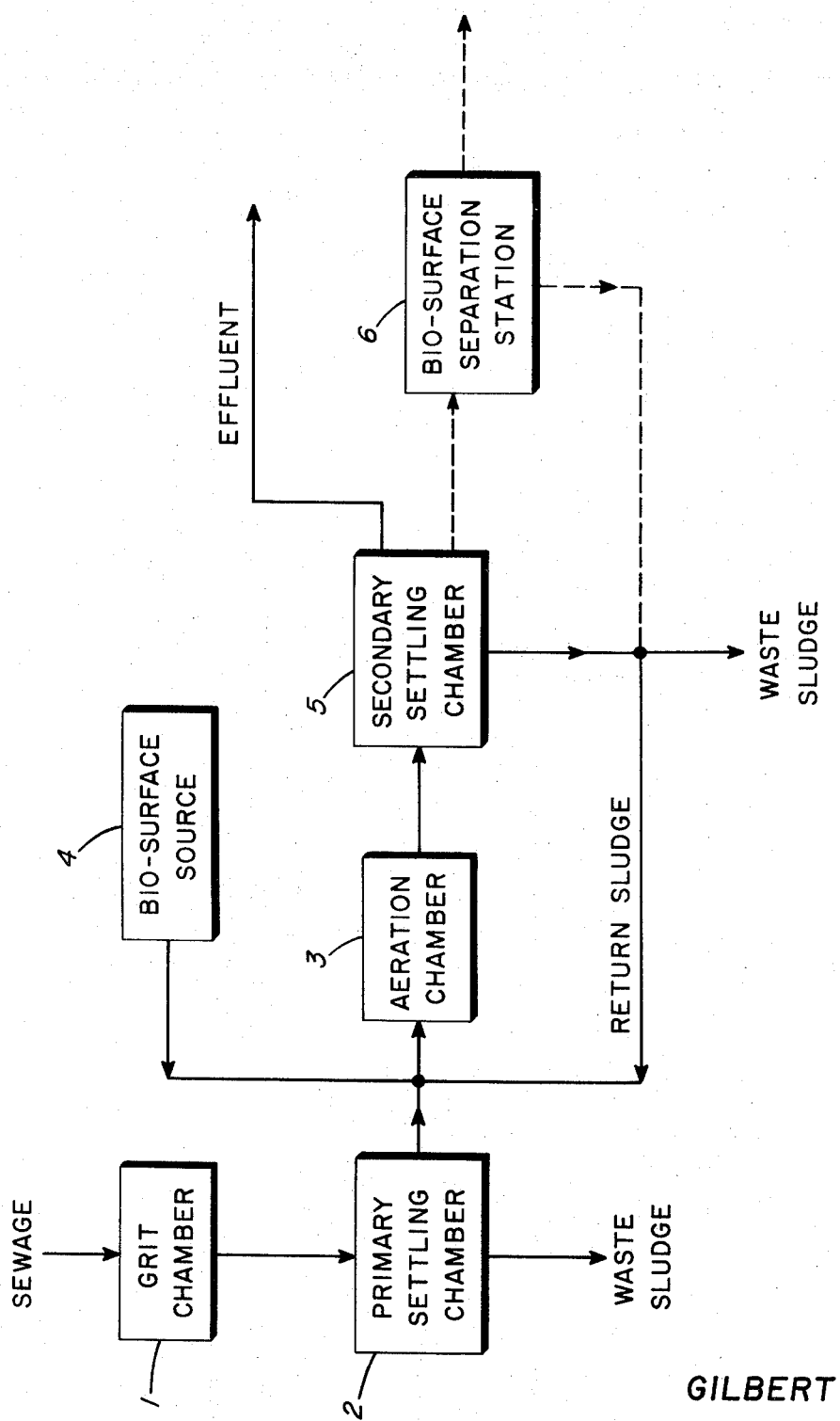

PLASTIC MOVING-SURFACE TREATMENT OF SEWAGE

This application is a continuation-in-part of application Ser. No. 2,496, filed Jan. 13, 1970 and now abandoned.

Among the sewage treating processes known to the art, two are of particular interest. The first is known as the activated sludge process, and the second is known as the trickling filter process.

In the typical activated sludge process, raw or primary settled sewage is mixed with secondary settled sludge to form a mixed liquor which is then aerated in an aeration basin. In the aeration basin, the microorganisms "graze" upon the mixed liquor, utilizing the organics and nutrients in the mixed liquor for additional cell production and metabolic energy. In this manner much of the organic matter present is metabolically oxidized with the result that considerable quantities of BOD (biochemical oxygen demand) are removed from the sewage. The mixed liquor then flows from the aeration basin into a secondary settling chamber and, after a suitable settling period, the supernatant is discharged as a final effluent and all or part of the settled sludge organisms are returned to be mixed with the incoming raw or primary settled sewage for another cycle. Excess sludge, amounts beyond that needed to sustain the process, is wasted.

The activated sludge process removes approximately 80 percent to 95 percent of the BOD contained in the raw sewage. The activated sludge process requires four to eight hours to achieve its maximum effectiveness. However, because of increased levels of population, this degree of sewage treatment is no longer adequate in many urban areas.

In theory, considerable microbial mass is produced during the aeration of mixed liquor in the activated sludge process. However, in practice, only modest cell population increases occur. In many areas, this modest cell population increase can be explained by the fact that the process operates at other than the optimum temperature. More importantly, however, a second factor is thought to play a larger role in the rate of cell population growth. This factor is the concentration of substrates which are present in sewage. The concentration of carbohydrates, for example, is generally two orders of magnitude below that which is recommended for the culturing of many microbial species present in sewage.

The second sewage treating process noted above, namely the trickling filter process, relates to a process in which raw or primary settled sewage is permitted to flow through a filter column of broken rock or synthetic material covered with films of microorganisms. This process, while resulting in only 60 percent to 75 percent BOD removal, does so in a matter of minutes. Thus, the initial rate of BOD reduction in the trickling filter process greatly exceeds that of the activated sludge process, but does so at the expense of a reduced final level of BOD removal.

The activated sludge process is in greater vogue today than is the trickling filter process simply because it produces a higher degree of BOD removal.

As noted above, the initial rate of BOD reduction in the trickling filter process exceeds that of the activated sludge process. Since the sewage temperature would be common to both processes, temperature is ruled out as the environmental factor causing the difference. It is suggested, then, that one important factor, at least in part responsible for the observed differences in the two processes, is the extensive surface area available to the microorganisms on the trickling filter rocks.

The fact that even extensive contact in the trickling filter will not produce BOD reduction levels achieved by the activated sludge process may, on the other hand, be attributable to the higher available oxygen concentration present and longer contact time in the activated sludge process.

Another possible factor which might further explain the early rate advantage of the trickling filter is that the trickling filter rocks might physically concentrate nutrients by adsorption. The resulting propinquity of the organisms and nutrients thus promotes biological activity.

SUMMARY OF THE INVENTION

The present invention relates to a highly efficient sewage treating process. The process combines the best features and advantages of the activated sludge and the trickling filter processes in a highly novel and unique fashion and, in operation, accomplishes very high degrees of BOD removal in relatively short treatment times.

For conceptual purposes only the novel process may be thought of as an activated sludge treatment process containing a recirculating trickling filter. By the present invention, there is added to the aeration basin in an activated sludge or aeration type of treatment process a plurality of what shall be termed "bio-surfaces" — a bio-surface being a particle of material capable of attracting both the sewage treating microorganisms, the nutrients and organics necessary for the growth of these microorganisms. The bio-surfaces comprise synthetic plastic surfaces. Preferably these bio-surfaces are particles having a specific gravity of from about 0.9 to about 1.3.

Initially, a charge of bio-surfaces is added, as a slurry, to the mixed liquor at the entrance to the aeration basin. During the aeration stage, the bio-surfaces provide suitable surface area for the growth of microorganisms. Simultaneously, the bio-surfaces concentrate nutrients and organic substrates through their adsorption mechanisms. Such concentration on the bio-surfaces should follow Freudlich's adsorption isotherm $$x/m = kC^a$$

where $x$ is the amount of substance adsorbed, $m$ is the mass of the adsorbient, $C$ is the concentration of the substrate and $K$ and $a$ are constants. In this manner, a myriad of favorable ecological niches or microenvironments, is established.

The present invention is based on the theory that if the microorganisms intercept the nutrients and substrates prior to physical adsorption by the bio-surfaces, or if they successfully remove the substances from the adsorption sites on the bio-surfaces, their metabolism and growth are greatly enhanced. Microorganisms and the substances they require for survival and growth are mutually concentrated on the bio-surfaces.

The bio-surfaces which are added according to the practice of this invention are synthetic plastic surfaces such as particles of a synthetic resin formed by either addition or condensation polymerization. Such resins include thermoplastic polymers such as polymers of olefins (e.g., homopolymers and copolymers of ethylene, propylene, 1- butene, etc.) including copolymers with polar monomers (e.g., ethylene-vinyl acetate copolymers); acrylic resins or elastomers (e.g., homopolymers and copolymers with each other or with other monomers of methyl acrylate, methyl methacrylate, ethyl acrylate, ethyl methacrylate, butyl acrylate, butyl methacrylate, acrylic acid and methacrylic acid); polystyrene; copolymers of styrene and other vinyl monomers such as acrylonitrile; vinyl polymers such as homopolymers and copolymers of vinyl acetate, vinyl chloride, alkyl vinyl ether and vinyl butyral; homopolymers and copolymers of dienes such as polybutadiene, polyisoprene, polychloroprene, butadiene-sytrene copolymers, isobutyleneisoprene copolymers and other unvulcanized elastomers including natural rubber. Chemical derivatives of such polymers and copolymers of ethylenically unsaturated monomers or dienes (e.g., chlorinated polyethylene, chlorinated polypropylene, chlorinated isoprene copolymers, salts of ethylenemaleic anhydride, ethylene-acrylic acid, ethylenemethacrylic acid, styrene-maleic anhydride and isoprene-maleic anhydride copolymers, and completely or partially hydrolyzed ethylenevinyl acetate copolymers) may also be used. Polymers of cyclic monomers may also be used (e.g., homopolymers and copolymers of ethylene oxide, propylene oxide, tetrahydrofuran, propiolactone, caprolactone, caprolactam and ethylene imine). Copolymers of carbon monoxide and sulfur dioxide may also be used (e.g., copolymers of carbon monoxide with ethylene and ethylene imine and copolymers of sulfur dioxide with $\alpha$-olefins, styrene, vinyl chloride and butadiene). Homopolymers and copolymers of carbonyl compounds may also be used (e.g., homopolymers and copolymers of formaldehyde, acetaldehyde, butyraldehyde, chloral, etc.). Condensation polymers may also be used such as polyesters and alkyd resins which are obtained by the condensation of a polyhydric alcohol and a polycarboxylic acid. Example of polycarboxylic acids which may be used to form the polyester resin include phthalic acid, phthalic anhydride, succinic acid, adipic acid, isophthalic acid, terephthalic acid, maleic anhydride, etc. The polyhydric alcohols which may be used in the preparation of the polyester or alkyd resin may include the glycols, such as ethylene glycol, propylene glycol, etc. Polyamide resins may also be used (e.g., polymers obtained by the condensation of a polycarboxylic acid such as adipic acid, terephthalic acid and dimer acid with a polyamine such as ethylene diamine, hexamethylene diamine and diethylene triamine). Polyurethanes may also be used (e.g., polymers obtained by reaction of a diisocyanate such as toluene diisocyanate and 4,4'-diphenylmethane diisocyanate with a polyol such as polyethylene oxide, polypropylene oxide, polytetramethylene glycol, hydroxyl-terminated polyesters, hydroxyl-terminated polyisobutylene and hydroxyl-terminated polybutadiene). Other thermoplastic resins based on bisphenol such as polycarbonates, polysulfones and polysulfonates as well as poly-2,5-dimethylphenylene oxide may also be used. Epoxy resins include the condensation products of bisphenol and epichlorohydrin, epoxidized drying oils, the glycidyl ethers of glycerol, epoxylated novolac resins, etc.

The synthetic plastic bio-surfaces may be inorganic particles which are coated with and coupled to a synthetic resin. U. S. Pat. No. 3,645,939 discloses a method for coating inorganic particles such as clay, sand and glass, with a thermoplastic polymer, whereby the polymer is coupled to the thermoplastic polymer. Such particles may be used in the practice of this invention.

In the preferred embodiment of this invention, the plastic surfaces are provided with surface charges. These charges may be positive, negative or amphoteric — i.e., containing both positive and negative charges. Many bacterial surfaces as well as nutrients, are negatively charged. Therefore, if the plastic surfaces are positively charged, the organisms and the nutrients will be attracted toward the plastic particles at an even greater rate than when using uncharged plastic particles. This results in an increased concentration of the organisms and the nutrients. The organic substrates, generally bearing little or no charge are physically adsorbed onto or concentrated near the particles.

Negative charge bearing plastics may be synthesized by the introduction of carboxyl or sulfonic acid groups into the polymer. Dowex 50 is a polymeric material obtained by sulfonation of a copolymer consisting of 92 percent styrene and 8 percent divinylbenzene, see W.C. Bauman and J. Eichhorn, J. Am. Chem. Soc. 69, 2830, 1947. A detailed study of the preparation of sulfonated polystyrene-divinylbenzene resins is described by K.W. Pepper, J. Applied Chem. 1, 124, 1951. Sulfonated styrene may be grafted to polyethylene using high energy radiation to form an exchange resin bearing negative charges, see A. Charlesby, "Atomic Radiation and Polymers," p. 403, Pergamon Press, N.Y., 1960. Examples of carboxyl group containing polmers are styrene-maleic anhydride copolymers and polyacrylic acid, see A. Cranshaw and G.B. Butler, J. Am. Chem. Soc. 80, 5464, 1958.

Synthetic polymers bearing positive charges may be produced by the introduction of primary, secondary, tertiary, or quarternary amine groups. Wheaton and Bauman in Ind. Eng. Chem. 43, 1088, 1951, describe the preparation of Dowex 1 and Dowex 2 which contain positive charges from polystyrene-divinylbenzene copolymers. Positive charge bearing polymers may also be synthesized by introducing quarternary amine groups into a polyethylene-styrene graft copolymer, formed via ionizing radiation, and by quarternization of a vinyl pyridine-polyethylene radiation induced graft, see A. Charlesby, "Atomic Radiation and Polymers," p. 403, Pergamon Press, N. Y., 1960.

Examples of high molecular weight polmeric poly-

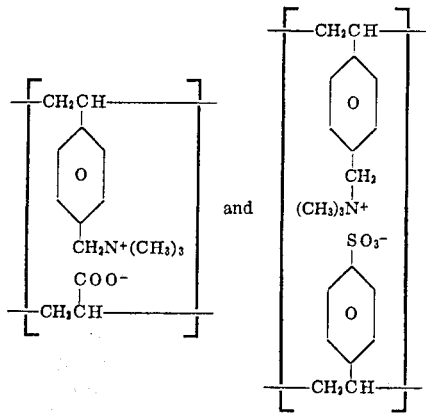

mers bearing both positive and negative charges (amphoteric polymers) include those containing repeating segments having the structures
see Dow Chemical Co., Midland, Michigan, Tech. Service Bull. 164-62, "Ion Retardation," and M. J. Hatch, J. A. Dillon, H. B. Smith, Ind. Eng. Chem. 49, 1812, 1957.

The size of the plastic added surfaces may vary widely and preferably is within the range of from about 0.05 to 1.0 mm in diameter. The size of the bio-surfaces employed may be mixed or segregated. It is also contemplated that the bio-surfaces be of an appropriate specific gravity or have other characteristics such as internal buoyance or the ability to hold attached gas bubbles, and thus permitting fairly uniform mixing in the aeration basin under the mixing influence of either air or pure oxygen. The quantity of the bio-surfaces may be varied to obtain the desired surface area-to-sewage volume ratio. The surfaces of the objects may be textured or smooth depending upon the desired nature and the level of biota to be accumulated thereon. The inert cores may be completely or partially covered by the active bio-surfaces. Also, the specific gravity or size of the bio-surfaces may be used as a criteria to assure convenient separation from the mixed liquor and to facilitate the return of these bio-surfaces to the aeration chamber. Separation may be by settling or flotation in the secondary settling basin.

The amount of plastic added surfaces used in the practice of this invention may also vary widely. The amount used may depend upon the solids content, the organic content, the phosphate content, etc., of the raw sewage. Generally, from about 1 to 20 pounds of plastic added surfaces per 1,000 gallons of raw sewage, or mixed liquor when sludge is recycled, is satisfactory.

During the aeration process, the bio-surfaces contact the sewage much in the manner of the contact characteristic of the trickling filter process. The aeration process, at the same time, highly aerates the liquid medium to promote microbial metabloism for the rapid and highly effective treatment of sewage. The plastic surfaces, particularly those with positive charges, attract the microorganisms present in the mixed liquor as well as the nutrients, principally phosphates and nitrates, and make them readily available for the microorganisms. The plastic surfaces also adsorb the organic material comprising the BOD load in the sewage, thereby creating micro-environments around each surface. This results in a concentration of the organics and the nutrients at the surfaces and serves to support the growth of the microorganisms. Thus, the sewage treatment process is accelerated by bringing together all of the essential components into close proximity at much higher concentrations than occur in a normal sewage treatment process. Accordingly, the practice of this invention attains a high degree of BOD removal in a relatively short period of time.

After flowing through the aeration basin for the established detention period, the mixed liquor is discharged into a secondary settling tank. The specific gravity of the bio-surfaces is then advantageously used to improve the separation characteristics of the sludge inasmuch as the sludge would largely adhere to the bio-surfaces. One additional advantage of rapid separation of secondary sludge is the prevention of phosphate discharge from treated sewage. The separated sludge, in appropriate portions, is then wasted or returned to the process.

The process of this invention may also be used in conjunction with a phosphate stripping step. Thus, the sludge which is separated from the secondary settling tank containing a substantial portion of the phosphate orginally present in the influent sewage may be passed to a phosphate stripping zone and treated to cause the microorganisms in the sludge to release phosphate. Such a treatment may be accomplished by holding the mixture under anaerobic conditions as described in U. S. Pat. No. 3,236,766; by aerating the mixture as described in U. S. Pat. No. 3,654,146; or by appropriate pH adjustment. This treatment causes the organisms in the sludge to release the phosphate which they have taken up in the aeration tank. The phosphate leaks out of the sludge into the liquid phase. A phosphate-enriched supernatant liquor is produced upon settling of the sludge. The sludge is recycled for mixing with raw sewage which is being fed to the aeration tank and the phosphate-enriched supernatant liquor may be treated to remove the soluble phosphate therefrom, such as by the addition of a phosphate precipitant.

Since the sewage treating process of the present invention is substantially more efficient than those processes known to the prior art, the sewage-handling capacity of presently existing sewage treating plants may be increased by converting to the process contemplated in the present invention and new sewage treating plants may be made more compact and still have the sewage-handling capacity exhibited by larger sewage treating plants employing prior art methods of treatment.

It is evident that by increasing the efficiency and level of BOD removal, the effects on water pollution of the discharge of sewage into our streams are minimized.

The sole FIGURE is a flow diagram representing the sewage treating process contemplated by the instant invention.

With reference to the FIGURE, raw sewage is introduced into the system at an optional grit chamber 1. After heavy easily settled materials, such as sand, grit and the like, are removed from the raw sewage by the grit chamber 1, the sewage to be treated may optionally be fed to a primary settling chamber 2.

After a time necessary to accomplish the primary settling operation if such is elected, the primary settled sewage flows to an aeration chamber 3. However, before, immediately after, or at various points where the primary settled sewage reaches the aeration chamber 3, it is mixed with an initial charge of plastic bio-surfaces supplied from a plastic bio-surface source 4. Therefore, in the aeration chamber 3, primary settled sewage and recycled sludge from the secondary settling tank are aerated in the presence of the bio-surfaces. In the aeration tank, the mixed liquor is aerated at a rate sufficient to maintain it aerobic — i.e., so that there is a measurable amount of dissolved oxygen present in the mixed liquor — in at least a part of the aeration tank for a period of 1 to 8 hours. During aeration, the bacteria present take up phosphate and consume organic matter present in the sewage. A high degree of BOD removal is obtained during aeration.

From the aeration chamber, sewage and the mixed liquor, including the plastic bio-surfaces, are fed to a secondary settling chamber 5 at a controlled rate providing the desired retention time in the secondary settling chamber 5. After a time, as determined by chamber design, sufficient for the completion of the secondary settling operation, the clarified liquid flows from the system as an effluent, with or without an optional chlorination process.

However, in the event some plastic bio-surfaces remain suspended in the effluent, the latter may be passed through a bio-surface separation station 6. At station 6, the plastic bio-surfaces are settled or floated or otherwise removed and returned to the aeration chamber 3 with or without additional treatment.

Also emergent from the secondary settling chamber 5 is the secondary separated sludge. This sludge is returned to the aeration basin 3, or may, alternatively, be expelled from the system as waste sludge, or as in most cases, appropriately divided between the two streams.

It should here be noted that the function of the plastic bio-surface source 4 is twofold. First, it serves to inject into the system an initial charge of plastic bio-surfaces. Second, it serves the purpose of periodically or continuously adding a make-up quantity of plastic bio-surface to maintain the level thereof at a predetermined and desired level.

The following examples illustrate specific embodiments of this invention.

EXAMPLE 1

Raw sewage (one million gallons per day — gpd) of approximately 150 parts per million (ppm) of BOD and containing 100 ppm of solids is mixed with recyle activated sludge and particles of a synthetic plastic containing a positive charge on the surface thereof. The presence of the plastic surfaces results in a higher rate of BOD removal than is obtained when the plastic surfaces are omitted. The effluent mixed liquor from the aeration zone is fed to a secondary settling tank. Clarified waste liquid is discharged to the effluent outflow. The settled mixture of sludge and plastic surfaces is withdrawn from the secondary settling tank at a rate of 150,000 gpd and returned to the aeration basin. Mixed liquor suspended solids are maintained at 2,500 ppm. Any excess solids is wasted from the return sludge line from the secondary settler. The process is operated to maintain a level of about 1,000 ppm of plastic surfaces as part of the 2,500 ppm suspended solids in the aeration zone, based on the amount of mixed liquor in the aeration zone.

EXAMPLE 2

The process of Example 1 is repeated except that the mixture of sludge and plastic surfaces withdrawn from the secondary settling tank is passed to a phosphate-stripping zone wherein it is held under anaerobic conditions for several hours. The conditions existing in the stripper induce considerable quantities of intracellular phosphate to leak out into the liquid phase. The mixture of phosphate-depleted sludge and plastic surfaces is recycled and mixed with incoming raw sewage to form the mixed liquor which is passed to the aeration tank. The phosphate-enriched supernatant liquor is withdrawn from the settling tank and is fed into a chemical precipitation tank where lime is added and mixed to form a phosphate precipitate. The phosphate precipitate is wasted and the phosphate-depleted effluent is discharged from the system. This process achieves a high degree of BOD removal and a high degree of phosphate removal from the sewage.

I claim:

1. An activated sludge sewage treatment process which comprises mixing influent sewage material with activated sludge to provide a mixed liquor, aerating said mixed liquor in the presence of a quantity of particles of synthetic plastic added surface sufficient to attract sewage treating microorganisms and the nutrients and organic matter necessary for the sustenance and growth of these microorganisms, settling the mixed liquor to separate particles of synthetic plastic added surfaces, a sludge portion and a clarified liquid portion, and recirculating at least a part of said sludge and said particles of synthetic plastic added surfaces for mixing with the influent sewage material.

2. The process as defined in claim 1, wherein said added surfaces comprise plastic particles having surface charges thereon.

3. The process as defined in claim 1, wherein said particles have an average particle size of from about 0.05 to 1.0 mm. in diameter.

4. The process as defined in claim 2, wherein said particles comprise inorganic particles coated with a synthetic polymer.

5. The process as defined in claim 1, wherein said surfaces are particles having a specific gravity of from about 0.9 to about 1.3.

6. The process of claim 2 wherein said sludge before recycling is passed to a phosphate-stripping zone wherein it is treated to cause the microorganisms in the sludge to release phosphate and provide a phosphate-enriched supernatant liquor.

7. The process as defined in claim 1, wherein said surfaces are recirculated with said returned sludge.

8. The process as defined in claim 1, wherein said surfaces are recirculated after being separated from said clarified liquid portion.

9. The process of claim 1, further comprising the step of adding to the system a make-up quantity of surfaces to maintain the concentration of same within predetermined limits.

10. The process of claim 1 wherein a portion of said sludge is passed to waste and wherein particles of synthetic plastic added surfaces present in said waste sludge are reclaimed for reuse in said process.

11. The process as defined in claim 2 wherein said particles of synthetic plastic added surfaces are present during the entire aerating step.

* * * * *